Patented Apr. 15, 1941

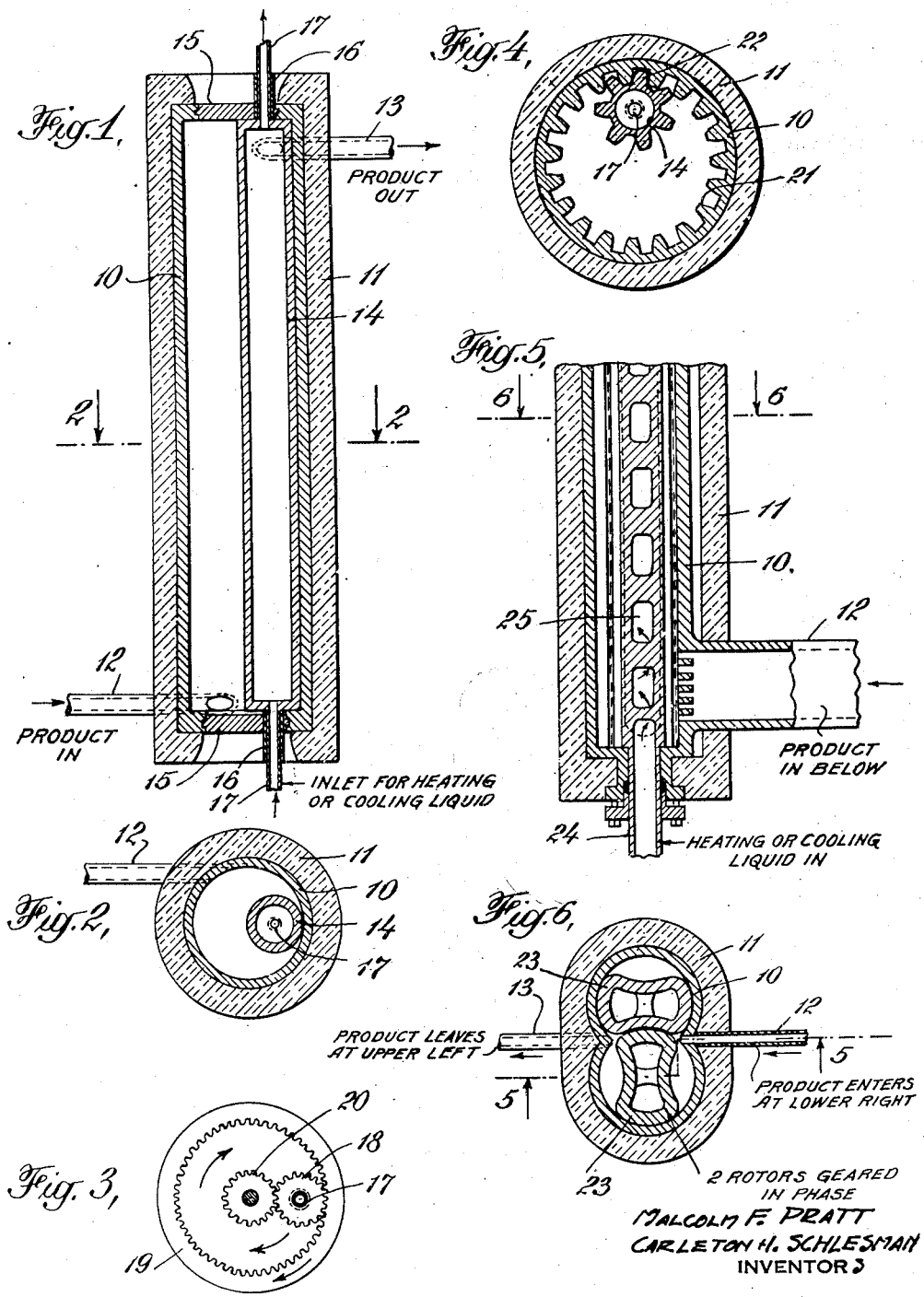

2,238,864

UNITED STATES PATENT OFFICE 2,238,864

PROCESSING EQUIPMENT

Malcolm F. Pratt, Woodbury, and Carleton H. Schlesman, Camden, N. J., assignors to Socony-Vacuum Oil Company, Incorporated, New York, N. Y., a corporation of New York Application September 15, 1939, Serial No. 295,094

4 Claims. (Cl. 259—5)

This invention has to do with apparatus wherein chemical reactions occurring in the presence of viscous fluid reacting media or reaction products may be carried out. It is particularly concerned with apparatus useful for reactions resulting in the formation of a viscous or plastic semi-solid or solid phase. As exemplary of such reactions, there may be pointed out the bodying of varnish bases, resulting in the formation of a viscous jellylike reaction product, and the precipitation by chilling of petroleum waxes from oils containing them, wherein a semi-plastic solid phase is formed.

The use of various types of mixing and agitating equipment in the chemical industry is well established. While equipment of a conventional type—such as that embodying propellor agitators in cylindrical vessels or blade-type stirrers in autoclaves—is quite satisfactory for the agitation of or reacting together of liquid phases, serious difficulties are experienced when attempting to employ conventional equipment in promoting reactions of liquids which, upon reaction form a viscous or plastic solid phase. In like manner, the use of conventional equipment in the precipitation of a solid phase—as, for example, in blade-type wax chillers—is very unsatisfactory.

Certain investigators have discovered that the use of turbulent flow minimizes the difficulties resulting from the formation of plastic reaction products of this character. For example, reaction vessels have been employed in which the reaction occurs in the steel tubes of small diameter while turbulent flow is being maintained. It will be appreciated that the amount of power necessary to create turbulent flow in the case of viscous fluids is enormous and that, hence, this form of equipment is uneconomical and impractical in many cases.

The present invention deals with a method of overcoming all the disadvantages formerly encountered in the chemical processing of materials of this character. The design of the apparatus and a method of employing it may best be illustrated by the use of the following example. In the manufacture of bodied oils and varnishes, it is customary to process the various ingredients thermally in a batch operation as, for example, in an open kettle. When attempts were made to carry on this processing or similar processing in a continuous unit, with formulas containing china wood and similar oils, difficulties were experienced because of fouling of the mixing equipment such as the stirrers, with a gelatinous, resin-like material which so impeded the motion of the stirrers as to render the equipment inoperative.

The proposed equipment surmounts the difficulties enumerated above in an original fashion. Apparatus for use in carrying out chemical processing of this character in a continuous fashion has been developed by employing a unique design of reaction vessel of such cross section and having such an arrangement of parts that the entire internal surface is swept by moving rotors and the surfaces of the rotors themselves are swept, so that all parts are subject alternately to turbulent flow followed by a period during which the liquid surrounding the surface is moving only in viscous flow.

The power losses resulting from the use of turbulent flow are minimized by employing such flow only for scrubbing. All surfaces which might become fouled with plastic masses or upon which solid material might collect are continually scrubbed either by a film of liquid under high velocity or, when desirable by actual approach of mechanical rotating parts.

This invention has for its object the provision of reaction housing apparatus wherein a uniform rate of overall flow may be maintained while still subjecting the reactant to varying rates of flow while within the apparatus. It has as a further object the provision of apparatus susceptible of accurate temperature control and capable of self cleaning. Other objects and advantages are in part obvious and in part will be pointed out hereinafter.

In its simplest forms, the invention consists of an externally insulated reaction vessel of cylindrical form in which is rotated eccentrically a smaller hollow cylinder which is at the same time rotating about its axis and which is fitted with inlet and outlet passages for heating or cooling medium or may be electrically heated. Similarly, an externally heated shell may be used with a heated or unheated rotor.

In order that the invention may be readily understood, reference is made to the drawing attached to this specification. In this drawing, Figure 1 shows, diagrammatically, a simple form of the apparatus, Figure 2 shows a cross section of the device of Figure 1, Figure 3 shows a modified form of the apparatus and Figures 4 and 5 show a further modification. Figure 6 shows a cross section of the modification of Figure 5.

In Figure 1, of which Figure 2 is a cross section, the two being read and described together, the improved reaction vessel is shown to consist of a cylindrical chamber 10, surrounded by appropriate heat insulation jacket 11 and equipped with inlet pipe 12 and outlet pipe 13. Mounted within this cylindrical chamber 10 is another cylinder 14, of smaller diameter. To permit of mounting inner cylinder 14 so that it not only contacts the wall of 10 but that it will be able to roll upon the inner surface of 10, we close each end of cylinder 10 with an end plate 15, which end plate may be secured to 10 by any one of several known methods whereby it may turn freely about the longitudinal centerline of 10 while still permitting no communication between the contents of 10 and the atmosphere. Properly located, off-center, in each plate 15, are bushings or bearings 16, wherein the spindles 17 of inner cylinder 14 are so mounted that 14 contacts with the inner surface of 10. Now, by a suitable external gearing arrangement, such as that shown in Figure 3, the inner cylinder 14 may be caused to pass over the inner surface of cylinder 10 and while so passing may be rotated so that its motion is either concurrent or opposed, that is, rolling or shearing. How this may be done may be understood by reference to Figure 3, wherein 17 is the extending spindle of cylinder 14, and 18 is a gear affixed thereto. 18 will be held in contact with ring gear 19 by central fixed gear 20. Now if 19 is revolved in a clockwise direction, gear 18 will not only revolve in a clockwise direction, but will progress around central gear 20 in a clockwise direction. This will give an opposed, or shearing action, because while cylinder 14 will be passing over the inner surface of 10 in a clockwise direction, it will itself be moving in a direction opposite to that it would assume if it were rolling. If ring gear 19 be fixed, and central gear 20 be the driving gear then a clockwise rotation of 20 will give a counter clockwise rotation of 18, which, however, will still progress clockwise around 19 and so a rolling contact between 14 and 10 may be had. This also may be made shearing by so proportioning the gearing with or without additional gears, that the peripheral speed of 14 is greater or less than its rate of progress over the surface of 10. Similar speed changes may be made in the opposed motion set up also. Spindles 17 of inner cylinder 14 are preferably hollow, so that a heating or cooling fluid for control of the reaction may be passed longitudinally through cylinder 14. It will be understood that suitable heat control mechanism may be substituted for the insulating jacket 11. In certain instances, it will be found preferable to so construct the inner surface of 10 and the external surface of 14, as shown in Figure 4 at 21 and 22, respectively, that the cylinders themselves are "gear-formed" throughout their length. In this case, the external gearing may be greatly simplified.

In operation, the reaction vessel will function as follows. Assume the reaction to be that of "bodying" a paint oil by exposure to a predetermined temperature for a predetermined length of time. In this operation, a resinous and viscous gel is formed which in continuous operations of the usual type has so fouled the agitating equipment and heat transfer surfaces as to render the apparatus inoperative. In our apparatus, the oil is passed at a continuous rate of flow through cylinder 10, at a temperature established by the passage of suitable fluid heat transfer material through cylinder 14. The viscous gel phase, which tends to form on and about the surface of 14 is continuously torn therefrom by the contact of 14 with the inner wall of 10, the relative rate and directions of rotation of 14 and the surface of 10 being adjusted so that the whole mass within 10 may be prevented from passing from a fluid to a gel state. This agitation is effected by the continuous interchange in the oil between a condition of viscous flow through the open portion of 10 and a highly turbulent flow adjacent the line of contact of 10 and 14. Also, the heat transfer surface of 14 is continuously cleaned, and the interior walls of the flow passage 10 are continuously cleaned.

More than one internal cylinder may be used. For example in Figure 5 there is shown a form utilizing two internal bodies, the cross section of which, seen in Figure 6, is not unlike that of a "Root" blower. In this modification, outer cylinder 10 is so shaped as to permit interior mounting of two interacting rotors 23, which rotors are externally geared, in known fashion, to operate in phase. Rotors 23 are internally hollow and their extended hollow spindle 24 permits the circulation of fluid heat transfer medium through the interior passage 25.

This form of equipment would be particularly useful for such operations as the chilling of a petroleum wax distillate to precipitate wax crystals therefrom prior to filtration to remove the crystallized wax. Cold brine being circulated through the interiors of rotors 23, semiplastic solid wax containing oil would be deposited in a film upon the surface of rotors 23, to be removed therefrom by the shearing contact between the rotors and between the rotors and wall of vessel 10.

It will be seen that we have provided a vessel for conducting chemical or physical reactions, which may be operated at any desirable absolute pressure or any desirable temperature, in which a definite reaction time may be obtained by complete avoidance of dead spaces, in which a very high rate of heat transfer is made possible by periodic scrubbing of the heat transfer surfaces with reaction fluid in turbulent flow, and which prevents the accumulation of scale, plastic material, or a viscous reaction phase upon the interior surfaces of the vessel. All of this is accomplished by application of the principle of rotation of one or a multiplicity of hollow, heat transfer material containing, geometric shapes within a cylinder or otherwise curved shell while reactants flow longitudinally therethrough.

In the following claims the word "cylinder" is not restricted to the specific form of a right cylinder of circular cross section, but may have its broader geometric meaning, indicating any body of uniform cross section the longitudinal elements of which are parallel to each other or to a given fixed line. Thus, item 14 of Figure 4 and 10 of Figure 6 are cylinders, having uniform cross section, and of such shape that any longitudinal element in their surface is parallel to any other longitudinal element.

By "contact" herein we do not necessarily mean actual superficial contact, but a sufficiently close approach of one surface to another to bring about a shearing action in a fluid present between said surfaces.

We claim:

1. Apparatus for conducting operations involving the formation in connection with a fluid reactant of a viscous, plastic or semi-solid phase comprising an outer cylinder with closed ends, means to flow fluid reactant longitudinally therethrough, at least one internal cylinder therein so mounted as to provide contact of the inner and outer cylinders along a common element, the inner surface of the outer cylinder and the outer surface of the inner cylinder being formed with matching longitudinal corrugations whereby the cylinders may intermesh in the fashion of an internal spur gear and pinion, means to flow fluid reactant longitudinally therethrough, means to pass fluid heat transfer medium through said inner cylinder while isolating it from contact with reactant fluid, and means to successively bring different portions of the outer surface of the inner cylinder in contact with different portions of the inner surface of the outer cylinder.

2. Apparatus for conducting operations involving the formation in connection with a fluid reactant of a viscous, plastic or semi-solid phase comprising an outer cylinder, means to flow fluid reactant longitudinally therethrough, rotatable end plates closing the ends of said cylinders, means to rotate said end plates, at least one internal cylinder within said outer cylinder rotatably and eccentrically mounted in said end plates and provided with means to cause rotation thereof so as to provide contact of the inner and outer cylinders along a common element, whereby different portions of the outer surface of the inner cylinder are successively caused to contact with different portions of the inner surface of the outer cylinder, and means to pass fluid heat transfer medium through said inner cylinder while isolating it from contact with reactant fluid.

3. The apparatus of claim 2 in which the inner cylinder and outer cylinder are so coupled by external gearing as to permit rotating the inner cylinder while rolling it along the inner surface of the outer cylinder to cause relative motion of the surfaces of the two cylinders while in contact.

4. Apparatus for conducting operations involving the formation in connection with a fluid reactant of a viscous, plastic or semi-solid phase comprising an outer cylinder, means closing the ends of said outer cylinder, at least one inner cylinder of substantially the same length and substantially smaller diameter than said outer cylinder mounted to contact said outer cylinder throughout substantially the entire length of each of said cylinders, means to flow fluid reactant longitudinally through said outer cylinder, means to pass a heat transfer medium in heat transfer relationship with said reactant, means to cause relative translational movement of said cylinders while maintaining said contact, and driving means independent of said contact to rotate said inner cylinder about its axis to repeatedly bring each portion of each of said cylinders in close contact with a portion of another of said cylinders, whereby the surfaces of said cylinders are continuously cleaned and viscous, plastic or semi-solid phases are continuously dispersed in said fluid reactant.

MALCOLM F. PRATT.
CARLETON H. SCHLESMAN.